July 10, 1934.  J. P. RYAN  1,966,359
MINERAL WASHING PAN
Filed Dec. 7, 1932

Joseph P. Ryan
INVENTOR

BY Victor J. Evans & Co.
ATTORNEY

Patented July 10, 1934

1,966,359

UNITED STATES PATENT OFFICE 1,966,359

MINERAL WASHING PAN

Joseph P. Ryan, Santa Monica, Calif.

Application December 7, 1932, Serial No. 646,167

1 Claim. (Cl. 209—447)

This invention relates to mineral washing pans and its general object is to provide a pan primarily designed for mining gold, that materially expedites the washing process without much fear or danger of losing the mineral as the pan includes means for retarding the mineral in its outward movement during the washing process and is therefore retained in the pan.

Another object of the invention is to provide a mineral washing pan that is capable of being used successfully by inexperienced or unskilled washers, and can be handled by skilled operators to produce maximum results in an easy and expeditious manner with very little effort.

A further object of the invention is to provide a mineral washing pan that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 2:
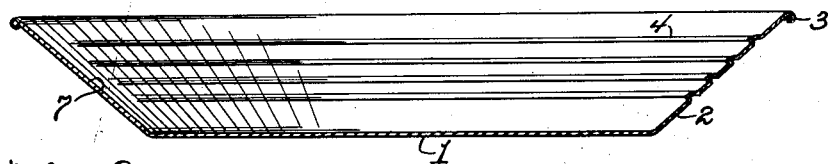
Figure 2 is a sectional view taken approximately on line 2—2 of Figure 1, looking in the direction of the arrows.
Figure 3:
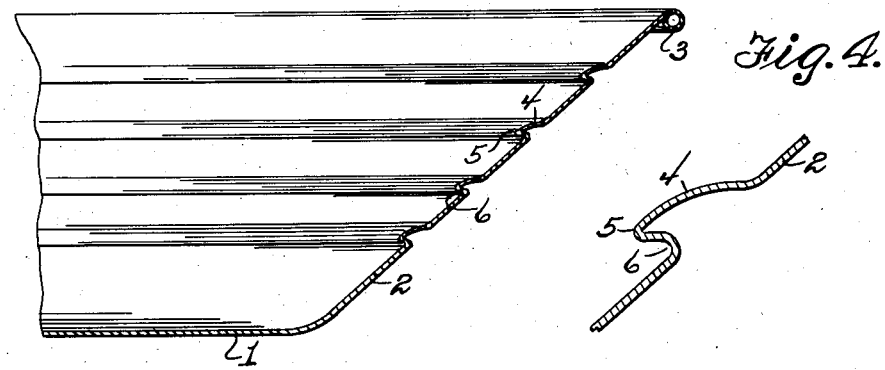
Figure 3 is an enlarged fragmentary sectional view taken through the pan.

Referring to the drawing in detail, it will be noted that my pan is of the usual configuration of pans used for washing gold and includes a flat bottom 1 and a rim 2 which is outwardly flared from the bottom as best shown in Figure 2 and has its outer edge rolled upon itself to provide a bead 3.

Figure 4:
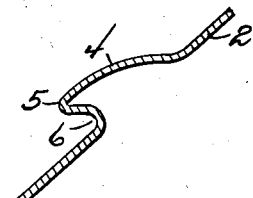
Figure 4 is an enlarged detail view to clearly illustrate the shape of the mineral retarding means or riffle.

The present invention resides mostly in the particular rim structure shown, in that the rim is circumferentially corrugated in a peculiar manner to provide a plurality of riffles 4 that are circumferentially spaced a considerable distance apart and are formed to present what may be termed a substantially S-shape configuration in cross section as clearly shown in Figure 4 for the purpose of providing an overhanging ledge 5 which produces a relatively deep upwardly extending channel 6.

Figure 1:
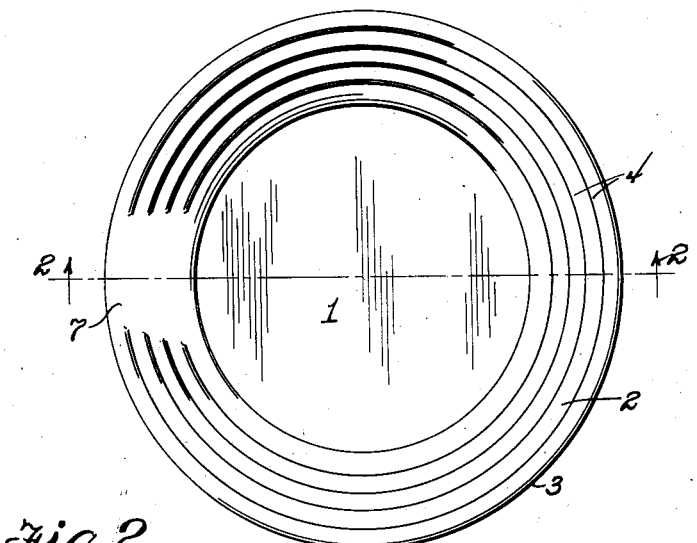
Figure 1 is a top plan view of the pan which forms the subject matter of the present invention.

While the riffles extend around the major portion of the rim 2, they terminate to provide what may be termed a smooth portion 7 on the rim 2, and the terminals of the riffles lie in converging lines whose point of intersection is exterior to the outer periphery of the rim because of the fact the riffles gradually increase in length from the innermost riffle to the outermost one as will be noted upon inspection of Figure 1, so that the smooth portion is wider at its inner end than at its outer end, with the result it is restricted toward its outer end as will be apparent.

From the above description and disclosure of the drawing, it will be obvious that I have provided a mineral washing pan that is extremely efficient for washing gold, in that the gold being heavy, will settle below the lighter material within the pan, consequently during the washing process, it will be caught under the overhanging ledges 5 and thereby be retarded in its outward movement from the pan, and be retained therein. When the light material has been thoroughly washed over the riffles, the fine sand may be washed off over the smooth portion 7, but the primary purpose of the smooth portion 7 is to remove the minerals and concentrates from the pan after the washing process.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A mineral washing pan of circular form comprising a flat bottom, an outwardly flared rim formed on said bottom and corrugated for the major portion of its circumference to provide riffles, said riffles being omitted in a comparatively small area of the rim and having their extremities lying in converging lines whose point of intersection is exterior to the outer periphery of the rim to provide a smooth portion restricted toward its outer end, and overhanging ledges included in the riffles to provide relatively deep upwardly extending mineral receiving channels.

JOSEPH P. RYAN.